UNITED STATES PATENT OFFICE.

ANTONIO IZIDRO GONSALVES, OF FUNCHAL, MADEIRA.

COFFEE-MILL.

1,247,394.

Specification of Letters Patent.   Patented Nov. 20, 1917.

Application filed July 18, 1917. Serial No. 181,299.

*To all whom it may concern:*

Be it known that I, ANTONIO IZIDRO GONSALVES, a citizen of the Republic of Brazil, and a resident of Funchal, Madeira Islands, have invented a new and Improved Coffee-Mill, of which the following is a full, clear, and exact description.

My invention relates to mills for grinding coffee and has reference more particularly to a manual device which is simple, compact, and by means of which a small amount of coffee may be ground quickly.

Another object of the invention is to provide a mill for coffee which is closed entirely during the grinding so that the aroma is prevented from escaping as the coffee is ground.

With these and other objects in view the nature of which will more fully appear as the description proceeds, the invention consists in the novel construction, combination and arrangement of the parts as herein fully described, illustrated and claimed.

Figure 1:
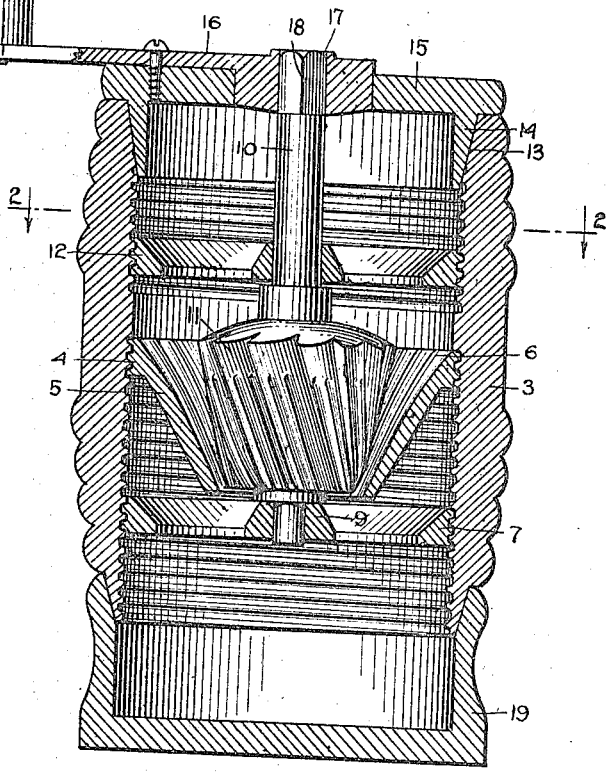
Figure 2:
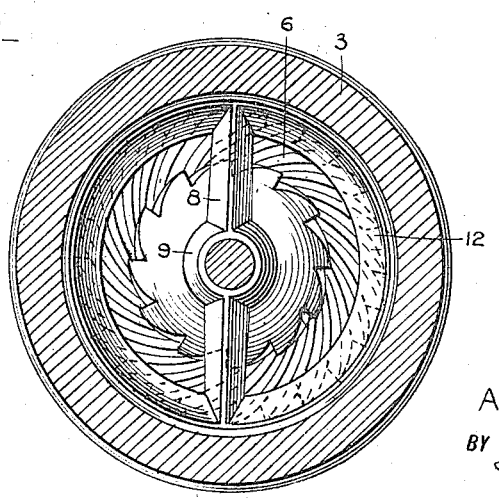

In the accompanying drawings, forming part of the application, similar characters of reference indicate corresponding parts in all the views, and Figure 1 is a longitudinal section through a mill embodying my invention; and Fig. 2 is a horizontal section on line 2—2, Fig. 1.

Referring to the drawings 3 is a tubular shell or housing of any suitable material. The shell is interiorly threaded from one end substantially to the middle so that the flange 4 of a frusto cone shaped sleeve 5 may be engaged with the housing, the narrow end of the sleeve when threaded into the housing pointing toward the end where the thread begins. This sleeve is indented interiorly by spiral teeth 6. The threads in the housing accommodate a ring 7 in proximity of the narrow end of the sleeve. The ring 7 has a bridge 8 which has a centrally enlarged portion 9 serving as a bearing for the lower end of a spindle 10. A toothed member 11 is constrained to revolve with the spindle 10. Said toothed member is the shape of a frusto cone the slope of which is less than that of a frusto cone shaped sleeve, so that there is a larger space between the sleeve and the frusto cone shaped member at the wider ends of same. The spindle 10 also bears in a ring 12 similar to the ring 7, which is disposed above the wider end of the sleeve within the housing 3 and with which it is engaged by means of threads provided on the ring and in the housing, leading from the upper end of the housing.

The upper end of the housing in proximity of the ring 12 is tapered as shown at 13 to accommodate the tapering end 14 of a cover 15, to the cover 15 a handle 16 is secured to revolve therewith, the tapering surface 13 serving as a bearing for the handle and cover. The cover has an angular aperture 17 into which the angularly shaped end of spindle enters and whereby rotary motion is transmitted to the spindle 10 and the frusto cone shaped member 11.

By means of the rings 7 and 12 the coarseness of the grinding may be controlled for the position of the toothed member 11 within the sleeve 5 depends on the position of the rings relative to said sleeve. The rings 7 and 12 serve as hoppers to and from the grinding members respectively.

The outer end of the housing below the ring 7 is tapered to engage a cup 19 into which the ground material is discharged after it has been crushed by the members 11 and 5.

When coffee is to be ground or other material of that character the cover 15 is simply raised and the material introduced to the grinding members through the ring 12. After the desired amount has been introduced the cover must be replaced to bring the handle 16 in engagement with the spindle. Thus the housing is completely closed while the grinding is carried on, the ground material falling into the cup 19. After the material is ground the cup is removed and in the case of coffee the material is introduced into a cup and boiling water poured on to it and infused. In consequence the aroma of the coffee has no time to evaporate and is retained by the infusion formed.

It will also be remarked that in the construction of my mill no screws, pins or nails are used for retaining any part in position. There are few members which go into the making of the mill and although the mill is of a small size all the parts constituting it are comparatively large in size and few.

I claim:

1. In a grinding mill a tubular housing, a frusto cone shaped sleeve threaded into the housing, rings threaded into the housing above and below the sleeve, said sleeve having an inner dented surface, a frusto cone shaped member positioned within the sleeve, a spindle constrained to rotate with said member and bearing in said rings, and means to revolve the frusto-cone member.

2. In a grinding mill a tubular housing, a frusto cone shaped sleeve within the housing, rings adjustably mounted above and below the sleeve within the housing so that the position of said rings in relation to said sleeve may be adjusted, a cone shaped toothed member adapted to be positioned within the sleeve and bearing in said rings, said rings preventing any longitudinal displacement of said toothed member and a handle engaging the toothed member to impart rotary motion to it.

3. In a grinding mill, a tubular housing, a frusto cone shaped sleeve secured in the housing, rings threaded into the housing above and below said frusto cone shaped sleeve so that the position of said rings may be adjusted relative to said sleeve, a frusto cone shaped toothed member in said sleeve, a spindle constrained to move with the toothed member and bearing in said rings, said spindle having shoulders for engaging said rings whereby longitudinal displacement of the spindle within the housing is prevented, and a handle for the spindle to impart rotary movement to same.

4. In a grinding mill, a housing, a stationary grinding member in the housing, a revoluble grinding member, and bearings above and below the stationary grinding member for said revoluble grinding member, said bearings forming hoppers to and from the grinding members respectively, said stationary revoluble member and bearings being adjustable within the housing relative to one another whereby the clearance between the revoluble and the stationary grinding members may be varied.

5. In a grinding mill, a housing, a stationary grinding member within the housing, a ring within the housing above the grinding member mounted to be adjusted to and from said fixed grinding member, and a revoluble grinding member bearing in said ring and having means which limit the axial movement of said revoluble grinding member, said ring serving as a hopper for allowing the matter to be ground to pass to said grinding members.

ANTONIO IZIDRO GONSALVES.

Copies of this patent may be obtained for five cents each, by addressing the "Commissioner of Patents, Washington, D. C."